Jan. 28, 1969

J. HASQUENOPH ET AL  3,424,017

MECHANISM FOR THE TRANSFORMATION OF A ROTARY MOVEMENT INTO
A TRANSLATIONAL MOVEMENT ALONG A CLOSED CURVE

Filed March 20, 1967

United States Patent Office 3,424,017
Patented Jan. 28, 1969

3,424,017
MECHANISM FOR THE TRANSFORMATION OF A ROTARY MOVEMENT INTO A TRANSLATIONAL MOVEMENT ALONG A CLOSED CURVE
Jean Hasquenoph, Lagny, and Claude Legendre, Chevilly-Larue, France, assignors to Commissariat a l'Energie Atomique, Paris, France
Filed Mar. 20, 1967, Ser. No. 624,470
Claims priority, application France, Mar. 29, 1966, 55,541
U.S. Cl. 74—60
Int. Cl. F16h 33/00; F16j 15/50
5 Claims

ABSTRACT OF THE DISCLOSURE

A mechanism for transforming a movement of rotation into a movement of translation along a closed curve wherein the driven component is rotationally locked and permitted to perform only a translational displacement by virtue of an oscillating collar provided at each extremity with a bevel pinion in mesh with identical pinions fixed one on a stationary bearing and the other on the driven component.

---

Figure 1:
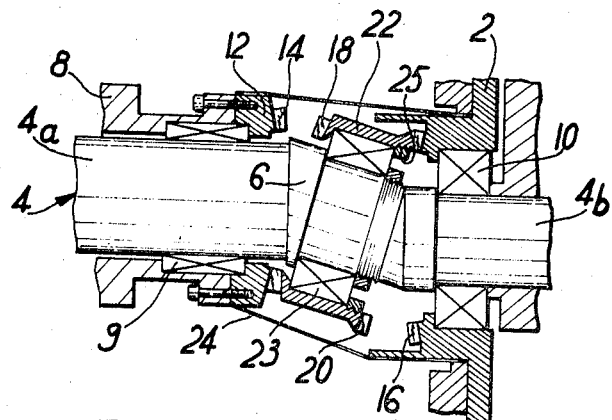

This invention is concerned with a device for the transformation of a movement of rotation into a movement of translation along a closed curve.

This transformation is usually carried out by means of a crankshaft, the component to be driven in translational motion being freely rotatable on the crankpin. However, said component must be connected to a fixed point in order that it may be prevented from rotating about its own axis and that its motion may be limited solely to a movement of translation. In practice, this connection is difficult to achieve, especially in the case in which the mechanism is intended to drive pumps, compressors or like devices which operate at high speeds. Moreover, the means at present employed are complex; they cannot therefore be readily adapted to all fluid circuits and particularly fluid circuits containing deleterious fluids or fluid which must not be in contact with the surrounding atmosphere.

The aim of this invention is to carry out a simple and effective transformation which can readily be isolated from the exterior and consequently be employed in mechanical appliances of the most varied types.

The invention is primarily concerned with a mechanism comprising an elbowed shaft having an oblique cranked section between two arms having parallel axes, one arm being rotatable in a stationary bearing whilst the other arm is adapted to support the component to be driven, a collar which is freely mounted to perform a rotational movement about said oblique crank and provided with a bevel pinion at each extremity so that one pinion is in mesh with an identical pinion which is rigidly fixed to the stationary bearing and the other pinion is in mesh with a second pinion which is rigidly fixed to the component to be driven, said collar being adapted to oscillate with the crank, as the second arm performs a movement of circular displacement about the first arm in which it drives the driven component, while always remaining in mesh with the two bevel pinions and thus preventing any relative rotational motion of said driven component and the stationary bearing.

According to another essential feature of the invention, the oscillating collar comprises a right circular cylinder which is coaxial with the crank and at each end of which is fixed a bevel-toothed crown.

The component to be driven thus retains its freedom of movement about the drive shaft but the oscillating collar serves to ensure that said component is rotationally locked about its own axis and permitted by means of its pinion to carry out only the same angular movement of displacement that the pinion which is rigidly fixed to the stationary bearing.

The above-mentioned collar as well as the pinions can also be readily protected by a bellows-type seal which is mounted around the elbowed shaft and isolates these elements from the external fluid. The device of the invention can thus operate even at a high speed with any type of fluid.

In the case of pumps, compressors and other multiple-piston devices, a motion-transformation mechanism is mounted in the drive system of each piston, all of the mechanisms being preferably driven simultaneously from a single drive system.

Figure 2:
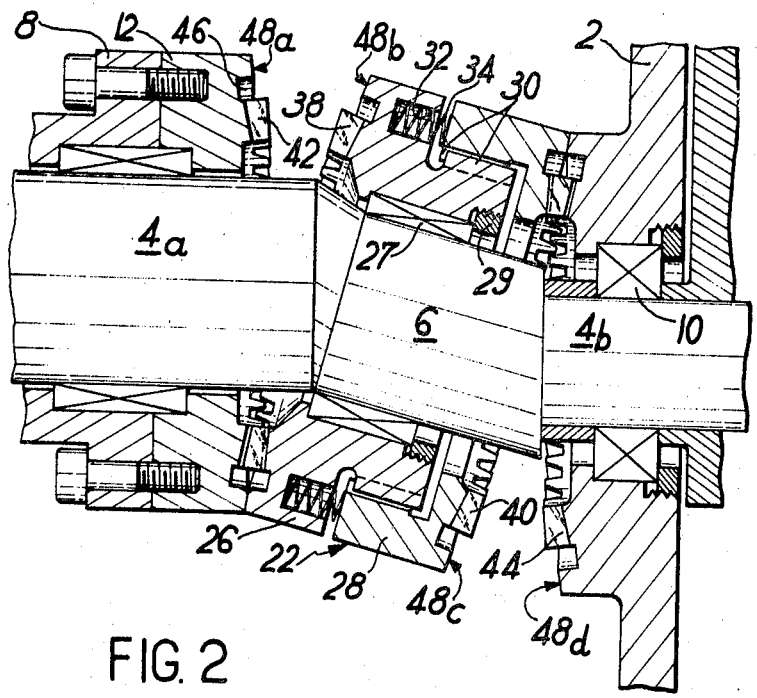
Figure 3:
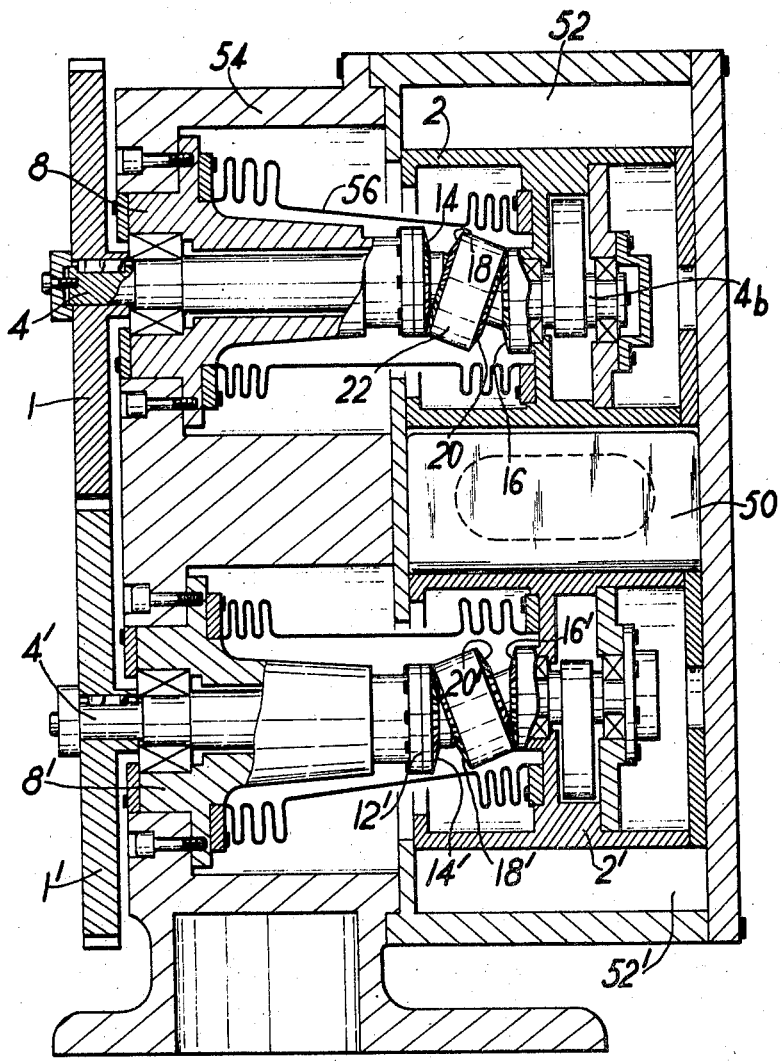

A number of other properties and advantages of the invention will also become apparent from the following description of one form of construction which is given by way of non-limitative example and illustrated in the accompanying drawings, in which:

FIG. 1 is an axial sectional view of a transformation mechanism according to the invention;
FIG. 2 is an axial sectional view of an alternative form of construction of said mechanism;
FIG. 3 is a sectional view of a pump comprising two pistons, each piston being driven by means of a mechanism for transforming a rotational movement into a translational movement along a closed curve.

In order to drive a component 2 in translational motion from a gear-wheel or rotary shaft, there is interposed between this drive system and said component 2 an elbowed shaft 4 (as shown in FIG. 1) comprising two parallel arms 4a, 4b and an oblique crank 6 which forms a junction section between said arms. The arm 4a is supported by roller bearings 9 on a stationary bearing 8 in which said arm is freely rotatable whilst the arm 4b is designed to carry the driven component 2 by means of a roller bearing 10 which permits of free rotation of said component.

The stationary bearing 8 terminates in an annular nose 12 which carries a bevel pinion 14 and the component 2 is also fitted with a bevel pinion 16 which is coaxial with the arm 4b. The pinions 14, 16 are respectively identical with two other bevel pinions 18, 20 each rigidly fixed to one of the ends of an annular collar 22 which is mounted on the crank 6 by means of a roller bearing 23 fixed in position by means of a nut 25. Said collar 22 is coaxial with said crank 6 but has substantially the shape of a right cylinder, so that the displacement of the crank produced by the movement of rotation of the shaft 4 causes said collar to oscillate between the bearing 8 and the component 2. However, the pinions 14 to 20 are so designed that they always remain engaged in pairs irrespective of the position of the collar.

A sleeve 24 which is fixed at one end between the nose 12 and the bearing 8 and at the other end on the component 2 surrounds the complete assembly of pinions 14, 16 and oscillating collar 22 and isolates them from the outer air.

During the rotation of the shaft 4, or more precisely of the arm 4a in the bearing 8, the arm 4b describes a circle about the axis of said arm 4a. Said arm 4b is consequently accompanied in its movement by the driven component 2 which is coaxial therewith. However, the pinion 16 which is mounted on said component 2 is in mesh with the pinion 20 which is rigidly assembled with the pinion 18. But said pinion 18 is engaged with the stationary pinion 14 and is therefore secured against rotation. The same applies to the pinions 20 and 16 and consequently to the component 2 which is permitted to move with the arm 4b in a movement of circular translation about the axis of the arm 4a but cannot rotate about its own axis or relatively to the stationary bearing 8.

In accordance with an alternative form of construction which is illustrated in FIG. 2, the collar 22 is constituted by two annular members 26, 28 which are fitted one inside the other but are provided with grooves and ribs or splines 30 enabling said annular members to slide relatively to each other and parallel to the axis of the crank 6. The annular member 26 is maintained on the crank 6 by means of a roller bearing 27 which is fixed in position by means of a nut 29 whilst the annular member 28 is simply supported by the member 26. Said member 26 is pierced by longitudinal blind-end bores 32 which serve as recesses for accommodating springs 34; said springs are applied against the annular member 28 and tend to urge this latter away from the member 26. Said annular members 26, 28 are each fitted with a bevel pinion 38, 40 respectively, each pinion being adapted to engage with an identical bevel pinion 42, 44 which is rigidly fixed respectively to the nose 12 of the bearing 8 and to the driven component 2. The two half-sections of the collar or annular members are provided in the same manner as the nose 12 or the driven component 2 with a channel followed by a smooth conical track 48a, 48b, 48c, 48d which is cut along the pitch-cone of the gear 42, 38, 40, 44. When the gears 38, 42 and 40, 44 are in mesh, the corresponding smooth tracks come into contact, thereby limiting the action of the springs 34. As a result, interference of the gear-teeth under the action of said springs is prevented, backlash is thus maintained at the normal value and wear is consequently reduced. Moreover, by virtue of their conical shape, the tracks referred-to are capable of rolling one over the other without sliding and do not brake the transmission of motion.

The operation of this embodiment is the same as that of the embodiment previously described; however, any play or variation in distance between working parts is immediately taken up, whether such play may arise from expansion or any other cause. Such an arrangement is also useful at the time of initial position-setting of the pistons.

The mechanism just described is similar to the system described in reference to FIG. 1 in that it produces a circular translational movement of a component without entailing any danger of rotation of this latter. The mechanism is therefore particularly well suited for the operation of pumps or like appliances in which two identical pistons 2, 2' each provided with a pallet 50 are designed to carry out a movement of displacement in symmetrical relation within two cylindrical chambers 52, 52'. As shown in FIG. 3, each piston is in this case mounted on the arm 4b of an elbowed shaft 4, 4' which is keyed to a gear 1, 1', these two identical gears being engaged with each other and driven by a pinion (not shown) which rotates in the opposite direction. Said gears are located outside a casing 54 which surrounds the transformation mechanisms and the cylindrical chambers. A bellows element 56 which is attached to the piston 2 and to the bearing 8 ensures imperviousness to penetration within the casing and also provides a separation between the pumped fluid and the outer air as well as between said fluid and the transformation mechanism components.

At the time of operation of the pump, the two shafts 4 which rotate in opposite directions and the arms 4b travel along symmetrical curved paths; the same applies to the pistons 2 and 2'. The pinions 14, 18, 20, 16 on the one hand and 14', 18' and 20', 16' on the other hand prevent any movement of rotation of the pistons 2 and 2' relatively to the bearings 8 and 8', namely with respect to the casing 54 in which said bearings are stationarily mounted. The pistons are thus locked rotationally both with respect to the same component and with respect to each other and the two pallets 50 remain constantly in contact with each other. The two movements of translation are perfectly symmetrical and strictly in synchronism.

There is no likelihood of any damage being caused to the transformation mechanism by the fluid by virtue of the presence of the belows element 56 to which the sleeve 24 may be added if necessary.

It is readily apparent that the invention is not limited to the form of construction which has just been described by way of example but that a number of different modifications could be contemplated without thereby departing either from the scope or the spirit of the invention.

What we claim is:

1. A mechanism for the transformation of a rotary movement into a translational movement along a closed curve comprising a driving shaft rotatable in a stationary bearing, a driven shaft parallel to said driving shaft, a component to be moved mounted for free rotation about said driven shaft, an oblique crank between said shafts, an oscillating collar coaxial with said oblique crank and mounted for free rotation about said oblique crank, a first bevel pinion mounted on one end of said collar in mesh with an identical pinion fixed to said stationary bearing and a second bevel pinion mounted on the other end of said collar in mesh with a pinion fixed to said component preventing said component from relative rotation with said oscillating collar and with said stationary bearing during the displacement in a closed curve of said component.

2. A mechanism in accordance with claim 1 said oscillating collar comprising two annular members each provided with a bevel pinion and capable of axial displacement with respect to each other, spacing springs being mounted between said members.

3. A mechanism in accordance with claim 2, each annular member being provided around the pinion with a smooth outer conical track designed to come into contact with an identical track of the bearing or of the component to be driven.

4. A mechanism in accordance with claim 1, a sealing sleeve being placed around the oscillating assembly and attached at one end between the bearing and the bevel pinion and at the other end to the component to be driven.

5. A pump and compressor mechanism comprising two pistons driven symmetrically in circular translational motion by means of mechanimsm for the transformation of a rotary movement into a translational movement along a closed curve, said mechanism comprising a driving shaft rotatable in a stationary bearing, a driven shaft parallel to said driving shaft, a component to be moved mounted for free rotation about said driven shaft, an oblique crank between said shafts, an oscillating collar coaxial with said oblique crank and mounted for free rotation about said oblique crank, a first bevel pinion mounted on one end of said collar in mesh with an identical pinion fixed to said stationary bearing and a second bevel pinion mounted on the other end of said collar in mesh with a pinion fixed to said component preventing said component from relative rotation with said oscillating collar and with said stationary bearing during the displacement in closed curved of said component.

References Cited

UNITED STATES PATENTS

| 2,860,933 | 11/1958 | Wolff | 74—17.8 |
| 2,863,336 | 12/1958 | Parstorfer | 74—17.8 |
| 3,196,698 | 7/1965 | Liddington | 74—60 |

FRED C. MATTERN, Jr., *Primary Examiner.*

W. S. RATLIFF, Jr., *Assistant Examiner.*

U.S. Cl. X.R.

74—17.8